(12) United States Patent
Nishizawa et al.

(10) Patent No.: US 7,633,653 B2
(45) Date of Patent: Dec. 15, 2009

(54) IMAGE READING APPARATUS

(75) Inventors: Seiji Nishizawa, Chuo (JP); Kazuhisa Mochizuki, Yamanashi-ken (JP); Masataka Hamada, Fuefuki (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 9 days.

(21) Appl. No.: 12/010,444

(22) Filed: Jan. 25, 2008

(65) Prior Publication Data

US 2008/0180763 A1 Jul. 31, 2008

(30) Foreign Application Priority Data

Jan. 31, 2007 (JP) ............................... 2007-022340

(51) Int. Cl.
*H04N 1/04* (2006.01)
*H04N 1/40* (2006.01)

(52) U.S. Cl. ........................ 358/461; 358/496; 358/498; 358/408

(58) Field of Classification Search ................. 358/461, 358/496, 498, 408, 406, 504; 382/274
See application file for complete search history.

(56) References Cited

U.S. PATENT DOCUMENTS

| 5,101,284 | A  | * | 3/1992  | Tanabe | 358/461 |
| 5,280,368 | A  | * | 1/1994  | Fullerton | 358/474 |
| 6,989,915 | B2 | * | 1/2006  | Honjo et al. | 358/461 |
| 7,379,216 | B2 | * | 5/2008  | Yang | 358/461 |
| 7,433,097 | B2 | * | 10/2008 | Spears | 358/504 |
| 7,466,458 | B2 | * | 12/2008 | Cheng | 358/461 |
| 2004/0179242 | A1 | * | 9/2004  | Nakaya | 358/461 |
| 2007/0070450 | A1 | * | 3/2007  | Tanaka et al. | 358/498 |
| 2007/0264062 | A1 | * | 11/2007 | Jinza et al. | 399/367 |
| 2008/0158621 | A1 | * | 7/2008  | Hamada et al. | 358/498 |

FOREIGN PATENT DOCUMENTS

JP 2004-056672 2/2004

* cited by examiner

*Primary Examiner*—Cheukfan Lee
(74) *Attorney, Agent, or Firm*—Manabu Kanesaka

(57) ABSTRACT

An image reading apparatus includes a reading unit having contact glass through which an image is read from a document, backup glass located opposite the contact glass of the reading unit so as to form a conveying path between the backup glass and the contact glass through which the document is passed, a white member located on a rear surface side of the backup glass which is different from a contact glass side of the backup glass, a support plate that allows the white member to pivot between a position where the white member stands opposite the contact glass via the backup glass and a retract position where the white member is retracted from the position where the white member stands opposite the contact glass, and a regulating member provided between the backup glass and the white member so as to create a specified gap between the white member and the rear surface of the transparent member. Thus, a fixed distance is always maintained between the movable white member, located opposite the reading position, and the document reading surface. As a result, accurate shading correction data is acquired.

6 Claims, 6 Drawing Sheets

IMAGE READING APPARATUS

BACKGROUND OF THE INVENTION AND DESCRIPTION OF THE RELATED ART

The present invention relates to an image reading apparatus that reads images from both sides of a document being conveyed, and more specifically, to a switching mechanism that switches a backup color on a backup guide lying opposite reading platen glass located in a reading section for reading images from a document.

What is called a sheet through image reading apparatus is conventionally known in which a stationary reading unit reads an image from a document passing through a reading section on a conveying path. With such an image reading apparatus, shading may vary in read images owing to, for example, a variation in sensitivity among pixels in a photoelectric converting element constituting image reading means, a variation in the quantity of light from a light source, a reflection mirror, or the like, the characteristics of the light source, the reflection mirror, or the like, or uneven image formation by lenses or the like. To correct the variation in shading, a white member for shading correction is provided opposite a reading platen. Shading image data is read from the white member at any timing. Shading corrections are then performed on image data to form appropriate read images.

However, with the conventional image reading apparatus, since the white member for shading correction is located opposite the reading platen, when the apparatus reads data from what is called a double-sided document having images such as characters printed on the opposite sides thereof, what is called offset may occur, that is, the image on the back side of the document may be simultaneously read. This disadvantageously prevents images from being accurately read. In particular, the offset may be significant in the case of thinner documents, resulting in a serious problem.

As means for preventing the offset, a switching mechanism is known which has a white member and a black member that are switched according to the type of the document. For example, Japanese Patent Laid-Open No. 2004-56672 proposes an image reading apparatus comprising transparent glass located opposite a reading position of a reading platen of image reading means, a white member and a black member located at a position where the members are laid on top of each other via the transparent glass, and a slide mechanism that slidably moves the white member located on a transparent glass side, between a first position where the white member is opposite the reading position and a second position where the white member is retracted from the first position. To acquire shading correction data, this apparatus slidably moves the white member to the first position where the white member is opposite the reading position. To read images from a thinner double-sided document, the apparatus slidably moves the white member to the second position where the white member is retracted from the first position so that the black member, positioned on the rear surface side of the white member, stands opposite the reading position.

However, since the white member is long in a main scanning direction, inclination may occur between one end and the other end of the white member in the main scanning direction. This may vary the distance from a light source to the white member at the reading position, disadvantageously preventing accurate shading correction data from being obtained. Furthermore, when the apparatus adopts the above-described slide mechanism, the slide mechanism must be provided outside a document main scanning range. The reading section thus has an increased size in the main scanning direction, disadvantageously preventing a reduction in the size of the apparatus.

An object of the present invention is to provide an image reading apparatus that can always maintain a fixed distance between a document reading surface and the movable white member located opposite the reading position, allowing accurate shading correction data to be acquired.

Another object of the present invention is to provide an image reading apparatus that need not have an increased size otherwise required in connection with the moving mechanism for the white member.

SUMMARY OF THE INVENTION

To accomplish the above-described objects, an image reading apparatus according to a first aspect of the present invention includes reading means having a reading surface on which an image is read from a document, a transparent member located opposite the reading surface of the reading means so as to form a path between the transparent member and the reading surface through which the document is passed, a white member located on a rear surface side of the transparent member which is different from a reading surface side of the transparent member, pivoting means for allowing the white member to pivot between a position where the white member stands opposite the reading surface via the transparent member and a retract position where the member is retracted from the position located opposite the reading surface, and regulating means provided between the transparent member and the white member so as to create a specified gap between the white member and a rear surface of the white member.

According to the first aspect of the present invention, the white member is configured to be pivotable, and the regulating member is provided between the transparent member and the white member so as to create the gap between the transparent member and the white member. This enables a reduction in the size of the apparatus without the need to increase the size of a moving mechanism for the white member. Furthermore, uneven, accurate shading correction data can be acquired.

An image reading apparatus according to a second aspect of the present invention includes reading means of an optical system which has a reading surface on which an image is read from a document, conveying means for conveying the document to a reading position provided on a reading surface, a transparent member located opposite the reading surface of the reading means so as to form a document conveying path between the transparent member and the reading surface, a pivoting member pivotably provided on a rear surface side of the transparent member which is different from a reading surface side of the transparent member, and a flexible white member attached to the pivoting member to pivot between an opposite position where the white member stands opposite the reading surface via the transparent member and a retract position where the white member is retracted from the reading surface. The white member has a first end fixed to the pivoting member and a swingable free end extending from the fixed end.

According to the second aspect of the present invention, the first end of the flexible white member is fixedly attached to the pivotable pivoting member, and the second end of the white member is swingably extended. Thus, when the white member moves to the opposite position, the main scanning direction of the white member is reliably set at a predetermined position. As a result, accurate shading correction data can be obtained.

DESCRIPTION OF THE BEST EMBODIMENT

Figure 1:
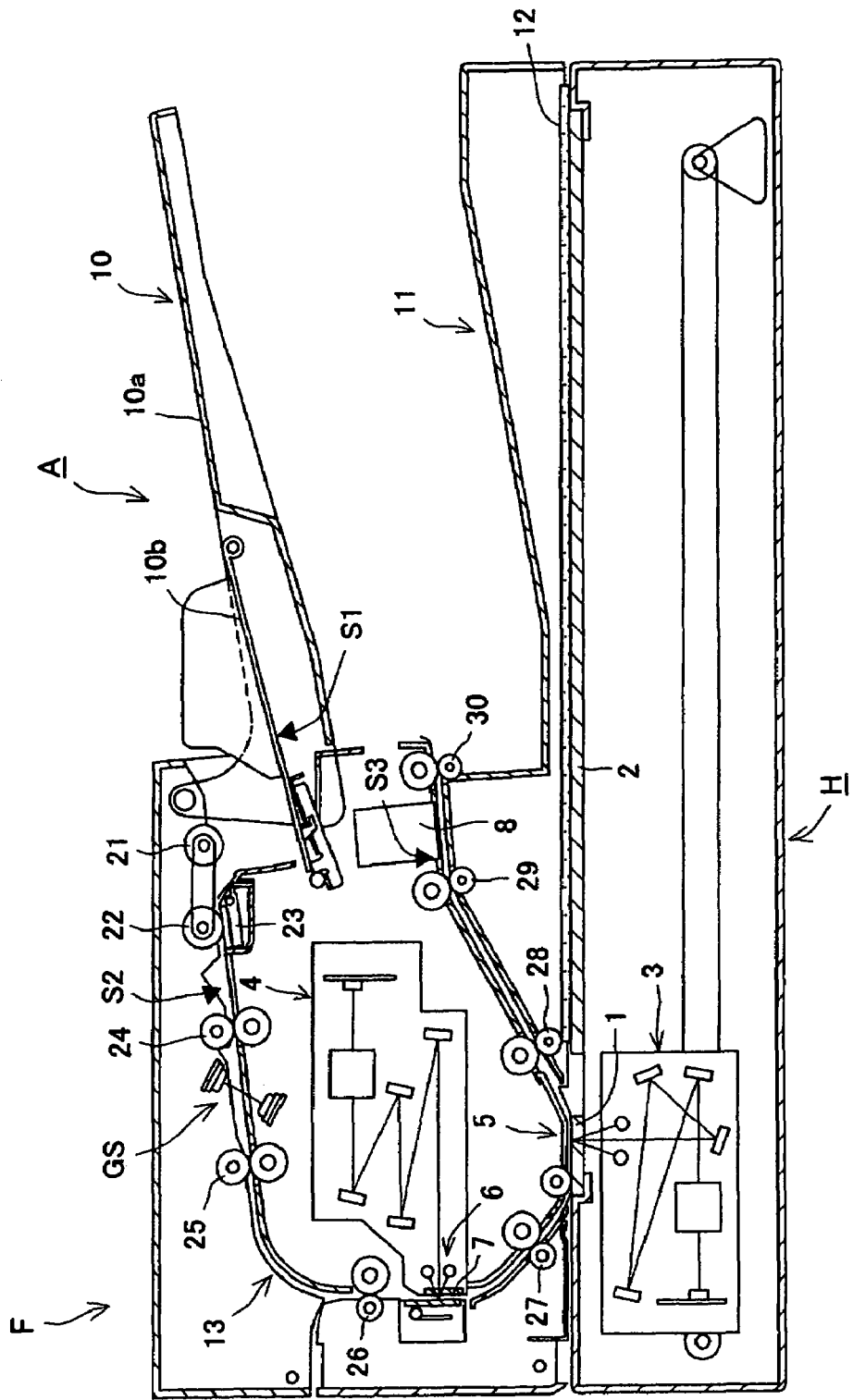
FIG. 1 is a sectional view showing an entire image reading apparatus comprising a document feeding device according to the present invention.
Figure 2:
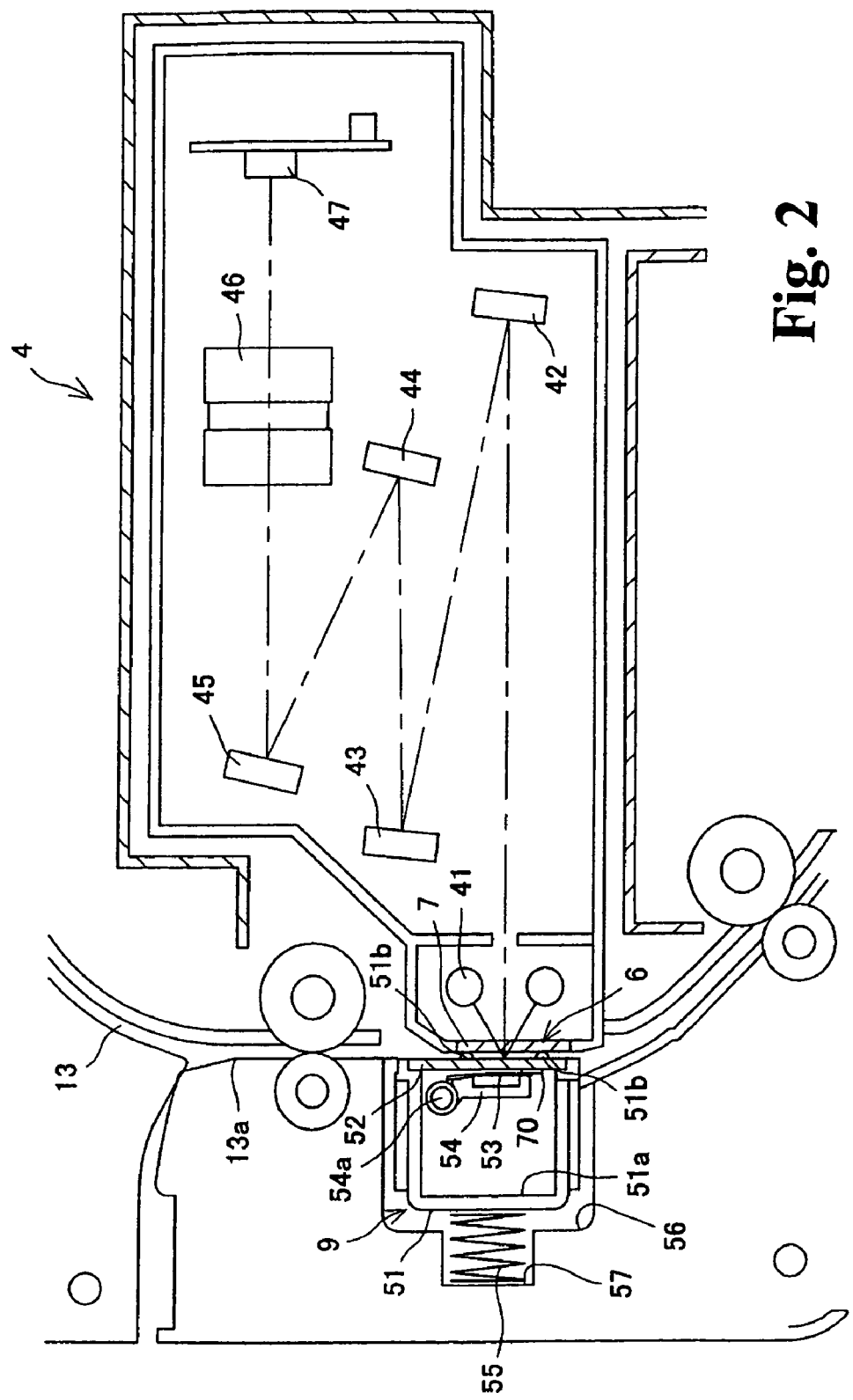
FIG. 2 is an enlarged sectional view showing the structure of a second reading section.

FIG. 1 is a sectional view showing an image reading apparatus in which a document feeding device is mounted. FIG. 2 is an enlarged sectional view showing the configuration of a reading section of a reading unit attached to the document feeding device.

In FIG. 1, reference character A denotes a document feeding device mounted above an image reading apparatus main body H. The document feeding device A conveys a document such that the document passes over first platen glass 1 provided on a top surface of the image reading apparatus H.

The image reading apparatus H comprises a first reading unit 3 that reads a document image by irradiating the document with light emitted by a light source such as a lamp via the first platen glass 1 so that the resultant reflected light is reflected by a plurality of mirrors and then photoelectrically converted by photoelectric conversion means such as a CCD via a lens. A first reading section 5 of the image reading apparatus H is formed on a top surface of the platen glass. The image reading apparatus H comprises a second platen glass 2 behind the first platen glass. The second platen glass 2 is configured such that the document image is read by opening the document feeding device A upward, placing a thick document such as a book or a magazine on the second platen glass 2, and moving the first reading unit 3 in a sub-scanning direction.

The document feeding device A comprises a sheet feeding tray unit 10 on which a document is placed, a sheet discharging tray 11 located below the sheet feeding tray unit 10 to house documents from which document images have been read by the image reading apparatus H, a pressing cover 12 used to press the second platen glass 2, and a U-shaped conveying path 13 along which the document is conveyed from the sheet feeding tray unit 10 to the sheet discharging tray 11. The pressing cover 12 is composed of a porous member, for example, a sponge, and a film member such as a white mylar sheet. The sheet feeding tray unit 10 is composed of a sheet feeding tray 10a that supports a trailing end of the document and an elevating and lowering tray 10b that elevates and lowers between a set position where the document is placed on the elevating and lowering tray 10b and a delivery position where the document is delivered from the elevating and lowering tray 10b.

The document feeding device A has a second reading unit 4 located at a curved portion of the U-shaped conveying path 13 to read a back surface image from the document. As shown in FIG. 2, the second reading unit 4 comprises a light source 41 such as a lamp which irradiates the document being conveyed on contact glass 7 with light, a plurality of mirrors 42, 43, 44, and 45 that guide reflection light from the document in a predetermined direction, a lens 46 that converges the reflection light guided by the plurality of mirrors 42, 43, 44, and 45, and a photoelectric conversion element 47 that photoelectrically converts the light converged by the lens 46.

The document is irradiated with light emitted by the light source such as a lamp via the contact lens 7, forming a part of the conveying path 13. The resultant reflection light is reflected by the plurality of lenses 42, 43, 44, and 45. The photoelectric conversion means 47 such as a CCD then photoelectrically converts the light via the lens 46 to read the document image. In this case, the top surface of the contact glass 7 constitutes the second reading section 6 of the image reading apparatus H.

Thus, in the document feeding device A, the second reading unit 4 reads the document image from one side of the document passing through the second reading section 6, located in the middle of the conveying path 13. The first reading unit 3 reads the document image from the other side of the document passing through the first reading section 5. This enables a sharp reduction in the time required to read images from double-sided documents.

The U-shaped conveying path 13 comprises a delivery roller 21 that delivers documents from the sheet feeding tray unit 10, separating means made up of a sheet feeding roller 22 and a separating pad 23 which separately feed each of the documents delivered from the delivery roller 21, and a registration roller pair 24 having a nip point against which a leading end of the document fed from the sheet feeding roller 22 abuts so that the leading end of the document aligns with the nip point to eliminate skewing, the registration roller pair 24 being subsequently driven to feed the document downstream. The conveying path 13 comprises a feeding roller pair 25 that feeds the document out from the registration roller pair 24 toward the second reading section 6 and the first reading section 5, a first reading roller pair 26 that supplies the document from the feeding roller pair 25 to the second reading section 6, and a second reading roller pair 27 that supplies the first reading section 5 with the document one side of which has been subjected to a reading operation. The conveying path 13 comprises a third reading roller pair 28 that carries out the document both surfaces of which have been subjected to reading operations by the second reading section 6 and the first reading section 5, a first sheet discharging roller pair 29 that receives, from the third reading roller pair 28, the document both surfaces of which have been subjected to the reading operations by the second reading section 6 and the first reading section 5 and which has passed through the first reading section 5, the first sheet discharging roller pair 29 then conveying the document toward the sheet discharging tray 11, and a second sheet discharging roller pair 30 that discharges the document onto the sheet discharging tray 11. In the present embodiment, the conveying path 13 is configured as a conveying unit F in which a plurality of members are incorporated.

The document feeding device A has an overlap detecting sensor GS on the path between the registration roller pair 24 and the feeding roller pair 25 on the conveying path 13. The overlap detecting sensor GS has an oscillating section that oscillates an ultrasonic wave and a receiving section that receives the ultrasonic wave, the oscillating section and the receiving section being arranged opposite each other via the path. The overlap detecting sensor GS detects that overlapping documents are being fed, on the basis of the vibration level of the received ultrasonic wave. An in-printer 8 is provided in a sheet discharging section of the conveying path 13 which is located closer to the sheet discharging tray 11. The in-printer 8 can print about five characters on a surface of the document discharged by the first sheet discharging roller 29 and the second sheet discharging roller 30, on the basis of a document detection result from a detecting sensor S3. Here, characters indicating that a conveyance error such as overlapping documents or an error in reading performed by the first or second reading unit 3 or 4 are printed on the document on which the error is occurring.

As shown in FIG. 2, a backup unit 9 is located opposite the contact glass 7 of the second reading unit 4. The backup unit 9 has a box-like base member 51 with a closed interior. Backup glass 52 is provided on a surface of the base member 51 which is opposite the contact glass 7 of the base member 51; the backup glass 52 serves as a conveying guide. A white member 53 is provided inside the backup unit 9, and the entire inner side wall of the base member 51 is black.

The backup unit 9 is formed in a groove portion 56 formed in an outer conveying guide 13a located opposite the reading surface. A recess portion 57 is formed at the bottom of the groove portion 56 so that a bias spring 55 biasing the backup guide 9 toward the contact glass 7 of the second reading unit 4 is located in the recess portion 57.

A plurality of projections 51b are provided at the opposite ends of the base member 51 of the backup unit 9 in the document main scanning direction. When the compression spring 55 biases the backup unit 9 toward the second reading unit 4, the plurality of projections 51a abut against a document reading surface of the contact glass 7 of the second reading unit 4 to minimize the distance between the contact glass 7 and the backup glass 52.

FIG. 3 is a perspective view showing the configuration of the backup unit 9. The backup unit 9 will be described in detail with reference to FIGS. 3 and 2.

The white member 53 is made up of a flexible film and is attached to a support plate 54 having a pivoting support point and serving as a pivoting member. The support plate 54 is allowed to pivot to move the white member 53 between a backup position where the white member 53 stands opposite a surface of the backup glass 52 which is different from a surface of the backup glass 52 which is opposite the contact glass 7 and a retract position where the white member 53 is retracted from the backup position. Since the white member 53 is moved between the backup position and the retract position, a backup color on the surface of the backup glass 52 located opposite the contact glass 7 is the white of the white member 53 when the white member 53 is at the backup position. On the other hand, when the white member 53 is at the retract position, the backup color on the surface of the backup glass 52 located opposite the contact glass 7 is substantially black because the entire inner wall surface of the base member 51 is black, so that the interior of the base member 51 forms a dark space. In the present embodiment, the inner wall surface 51a of the base member 51, which is opposite the contact glass 7, is located away from the focal depth of the reading units to form a space between the focal position and the inner wall surface 51a of the base member 51. Thus, light emitted by the light source 41 and reaching the inner wall surface 51a of the base member 51 is attenuated before reaching the inner wall surface 51a. This reduces the quantity of reflection light from the inner wall surface 51a to reliably prevent the possible offset of the document.

As described above, moving the white member 53 between the backup position and the retract position enables the color of the area located opposite the contact glass 7 to be switched between white and black. This makes it possible to select the backup color to be white in order to obtain shading correction data or to be black in order to read images from a double-sided document that may suffer offset. Thus, the acquisition of the shading correction data and the prevention of the possible document offset can be reliably achieved at the same reading position.

The support plate 54, to which the white member 53 is attached, has a first pin 54a and a second pin (not shown) provided at the opposite ends thereof in the main scanning direction and serving as pivoting support points. The first pin 54a and the second pin pivotably engage the opposite sides of the base member 51. One of the pins, the pin 54a, extends out from the base member 51 through the corresponding side thereof. The pin 54a, extending out from the base member 51, has a pivoting lever 58 integrally provided at an end thereof in order to allow the support plate 54 to pivot.

A driving mechanism allowing the support plate 54 to pivot is composed of a solenoid SOL serving as a driving source for allowing the support plate 54 to pivot, a fan-like first gear 59 that transmits driving by the solenoid SOL to the pin 54a, serving as a pivoting support point of the support plate 54, and a second gear 62 with some teeth missing. A link member 60 is formed integrally with a rotating shaft of the first gear 59 and coupled to a plunger of the solenoid SOL. An L-shaped rotating arm 63 is formed integrally with a rotating shaft of the second gear 62 and abuts against the pivoting lever 58, provided at the tip of the pin 54a of the support plate 54. A hook-like attachment portion 61 to which a tension spring 64 is attached is formed integrally with the first gear 59. The tensile gear 64 is attached between the first gear and an apparatus frame (not shown) to always bias the first gear 59 counterclockwise.

Figure 3A:
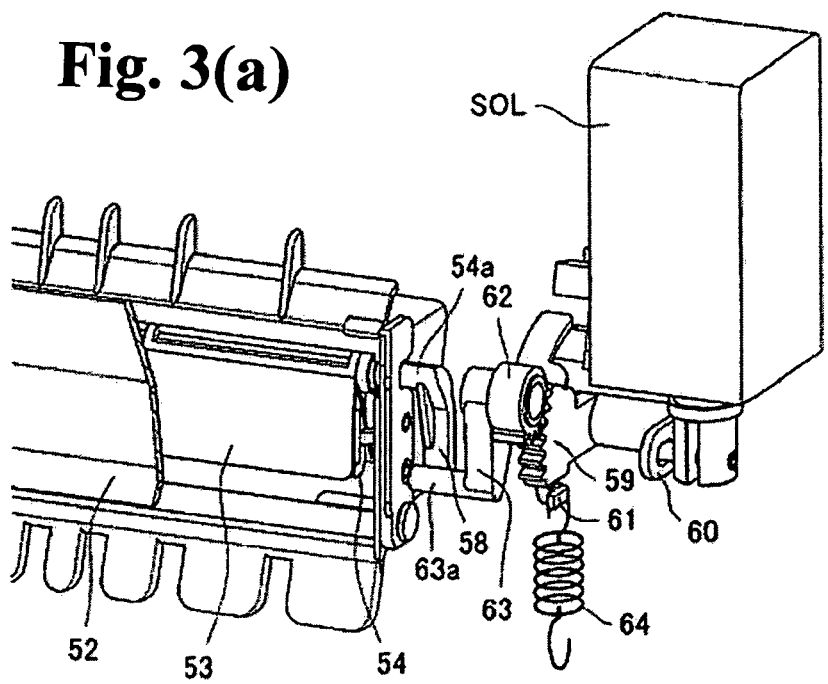
FIG. 3(a) is a perspective view showing the configuration of a backup unit with a white member located at a backup position.

Now, a pivoting operation of the support plate 54 will be described. When the white member 53 moves to the backup position where the white member 53 stands opposite the surface of the backup glass 52 which is different from the contact glass 7 as shown in FIG. 3(a), the solenoid SOL is excited to suck the plunger of the solenoid SOL. When the plunger is sucked, the link member 60, coupled to the plunger, rotates clockwise, and the first gear 59 rotates in the same direction as that in which the link member 60 rotates, against the bias force of the tension spring 64. The rotation of the first gear 59 rotates the second gear 62 meshed with the first gear rotates counterclockwise. As the first gear 59 rotates, the rotating arm 63 rotates in the same direction as that in which the second gear 62 rotates, using a shaft of the second gear 62 as a support point. The rotating operation of the rotating arm 63 allows a tip portion 63a of the L-shaped rotating arm 63 to abut against the pivoting lever 58. Using the pin 54a as a support point, the pivoting lever 58 rotates counterclockwise, that is, in a direction in which the support plate 54 leaves a rear surface of the backup glass 52. This moves the white member 53, attached to the support plate 54, from the backup position to the retract position, shown in FIG. 3(b).

Figure 3B:
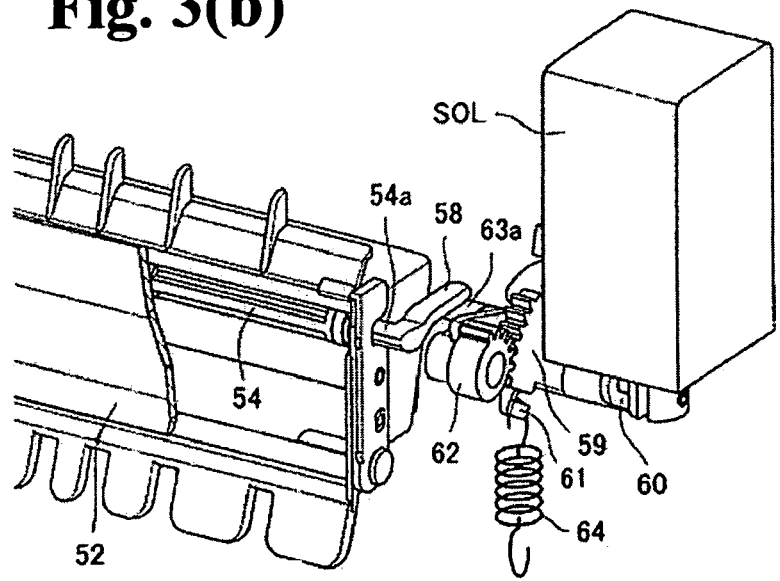
FIG. 3(b) is a perspective view showing the configuration of the backup unit with the white member located at a retract position where the white member is retracted from the backup position.

Furthermore, when the excitation of the solenoid SOL is canceled in the condition shown in FIG. 3(b), the plunger of the solenoid becomes free. Once the plunger of the solenoid SOL becomes free, the first gear 59 is rotated counterclockwise by the bias force of the tension spring 64. The rotation of the first gear 59 rotates the second gear 62 clockwise which is meshed with the first gear 59. As the second gear 62 rotates, the abutting member 63 uses the shaft of the second gear 62 as a support point to rotate in the same direction as that in which the second gear 62 rotates, that is, in the direction in which the tip portion 63a of the L-shaped rotating arm 63 leaves the pivoting lever 58. The pivoting lever 58 and the support plate 54 rotate clockwise under the own weight in conjunction with the rotating operation of the rotating arm 63 so as to hang downward. This moves the white member 53 attached to the support plate 54 from the retract position to the backup position, shown in FIG. 3(a).

Figure 4:
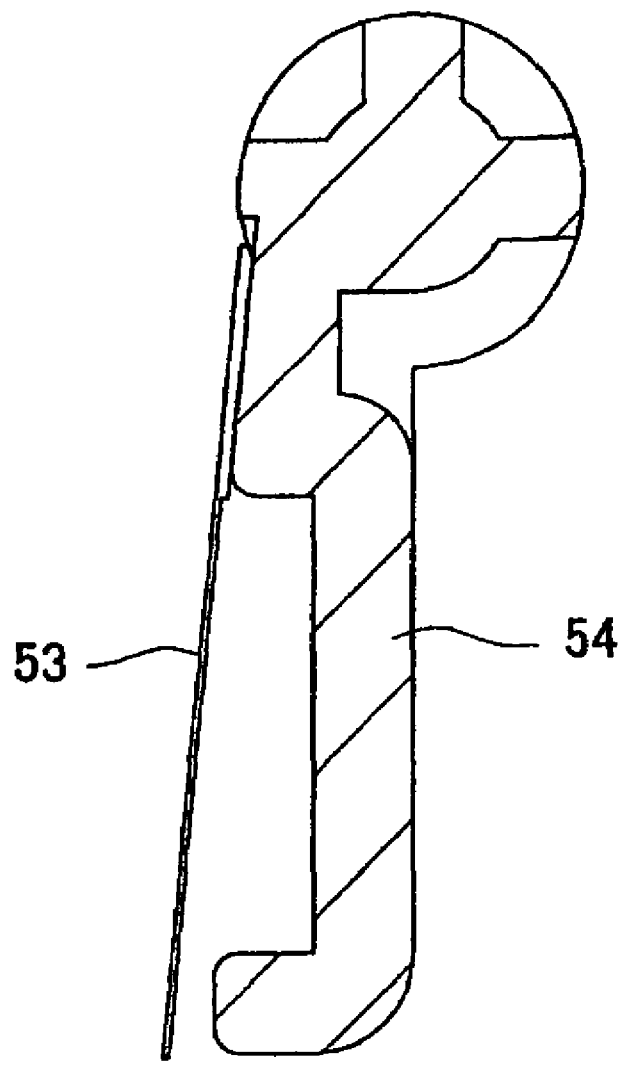
FIG. 4 is a sectional view showing a mounting configuration of a white member.
Figure 5A:
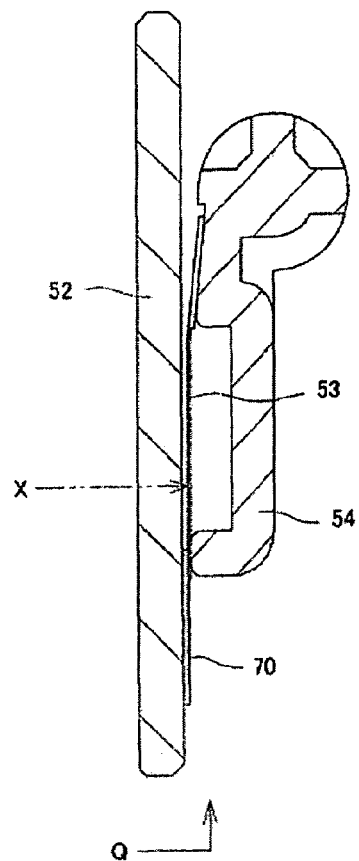
FIG. 5(a) is a sectional view showing that the white member has moved to the backup position.
Figure 5B:
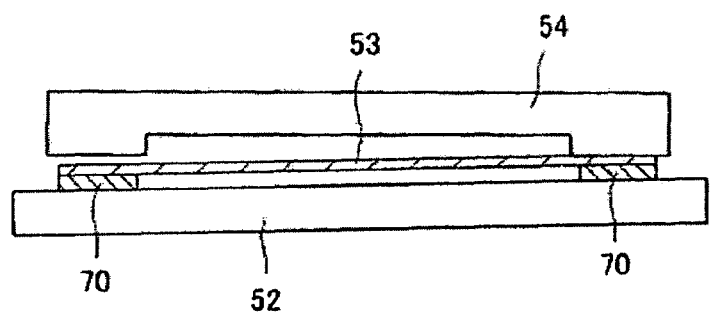
FIG. 5(b) is a bottom view showing that the white member has moved to the backup position.

FIG. 4 is a sectional view showing that the white member 53 is attached to the support plate 53. FIG. 5(a) is an enlarged view showing that the white member 43 has moved to the backup position, where the white member 43 stands opposite the rear surface of the backup glass 52. FIG. 5(b) is a diagram of the white member 53 as viewed in the direction of arrow Q in FIG. 5(a). As shown in FIG. 4, one end of the white member 53 is fixed to the support plate 54, and the other end thereof is free. The free, other end of the white member 53 lies at a short distance from the support plate 54. A regulating member 70 against which the white member 53 abuts is provided on the rear surface of the backup glass 52. The regulating member 70 creates a gap between the backup glass 52 and the white member 53 at the reading position. The gap prevents possible Newton rings that may result from the abutment of the white member 53 against the backup glass 52.

As shown in FIG. 5(a), the white member 53, attached to the support member 54, is moved under the weight of the support plate 54 to abut against the regulating member 70, attached to the rear surface of the backup glass 52. At this time, since the white member 53 is made up of a thin film member, the white member 53 is slightly bowed by a bias force caused by the weight of the support plate 54 when the white member 53 abuts against the regulating member 70. Thus, even if a first end of the white member 53 in the main-scanning with direction abuts against the support plate 54 as shown in FIG. 5(b), the abutting end is bowed to allow a second end of the white member 53 in the main-scanning width direction to move to the position where the second end abuts against the regulating member 70. That is, when the white member 53 is composed of the thin film member and the second end of the white member 53 is free and attached to the regulating member 70 so that the second end is at a short distance from the support member 54, the white member 53 abuts against the regulating member 70 while avoiding having only the first end abutting against the support plate. This fixes the position of the white member 53 in the main scanning direction with respect to the light source, allowing appropriate shading correction data to be obtained. The above-described configuration makes it possible to ease an impact occurring when the white member 53 abuts against the regulating member 70.

The reading position X, where the data is read from the white member 53 in order to reliably fix the distance from the contact glass 7, is preferably set near the position where the free, second end of the white member 53 abuts against the regulating member. In the present embodiment, as shown in FIG. 5(a), the reading position X, where the reading unit 4 reads the data from the white member 53, is set at a position closer to the position where the support member 54 abuts against the regulating member, than to the position corresponding to substantially the half of the free portion of the white member 53.

In the above-described embodiment, the operation of moving the white member 53 from the retract position to the backup position is performed under the weight of the white member 53. However, to allow the white member 53 to reliably abut against the regulating member 70, a spring member such as a tension spring may be used to bias the support plate 54 toward the backup position.

Figure 6:
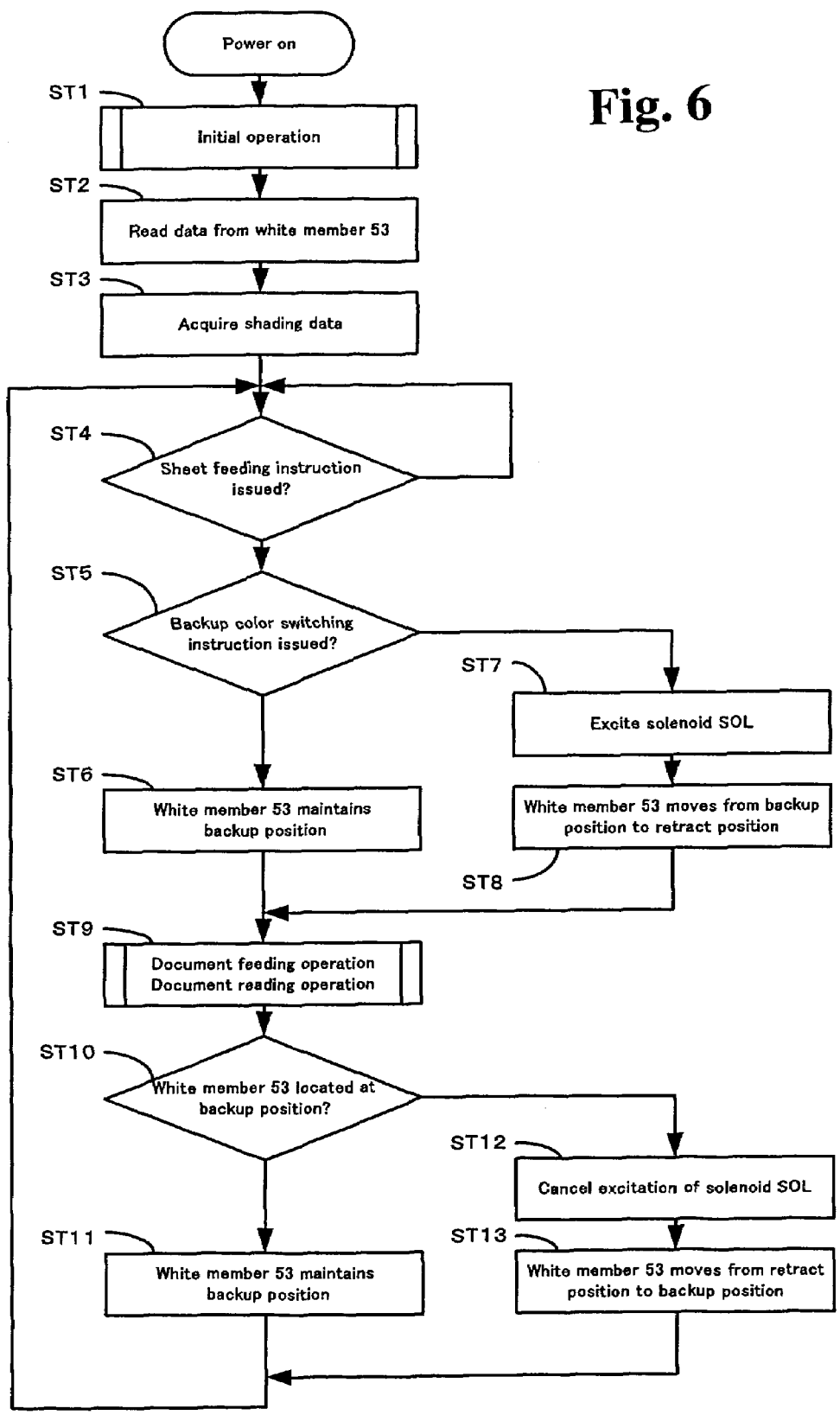
FIG. 6 is an operation flow chart showing pivoting control for the white member.

FIG. 6 is an operation flow chart showing a switching operation of switching the backup color on the surface of the backup member located opposite the contact glass, between white and black.

First, a power switch for the apparatus is turned on to power on the apparatus. An initialize operation is then performed (ST1). After the initialize operation is performed, the second reading unit 4 reads the shading correction data from the reading member 53 (ST2 to ST3). Subsequently, a sheet feeding button on an operation panel (not shown) of the apparatus is pressed to issue a sheet feeding instruction. The apparatus then determines whether or not an instruction for switching the backup color has been issued (ST4 to ST5). The backup color switching instruction is issued on the basis of selection made by an operator via a switching button (not shown) on the operation panel.

If the backup color switching instruction has not been issued, the white member 53 is held at the backup position (ST6), that is, the backup color is white. On the other hand, if the backup color switching instruction has been issued, the solenoid SOL is excited to move the white member 53 to the retract position (ST7 to ST8). This switches the backup color to the black of the inner wall surface 51a of the base member 51. When the backup color selected by the switching instruction is selected, the apparatus performs operations of conveying a document and reading images from the document (ST9).

Once the conveying operation and reading operation are performed and images are read from all the documents on the sheet feeding tray 10, the position of the white member 53 is detected (ST10). If the white member 53 is at the backup position, the white member 53 is held at the backup position (ST11). On the other hand, if the white member 53 is at a standby position, the excitation of the solenoid SOL is canceled to move the white member 53 to the backup position (ST12 to ST13). That is, the white member 53 is returned to the initial state where the white member 53 is at the backup position. The white member 53 then stands by at the backup position until the next sheet feeding instruction is issued. The position of the white member 53 can be easily detected on the basis of whether or not the solenoid SOL is excited.

Now, the document feeding operation and the reading operation will be described. On condition that an empty sensor S1 senses that a document has been placed on the sheet feeding tray unit 10, the delivery roller 21 and the sheet feeding roller 22 are driven. A plurality of documents are then sequentially delivered, and the separating pad 23 separates a document from the remaining documents and feeds the document. When a registration sensor S2 senses the leading end of the fed document, the document is conveyed by a predetermined amount from the point in time when the leading end is sensed. The leading end of the document then abuts against the nip portion of the registration roller pair 24 for alignment to eliminate skews. Subsequently, the registration roller pair 24, the feeding roller pair 25, and the reading roller pairs 26, 27, and 28 are driven. The document is thus conveyed along the U-shaped conveying path 13 so as to be turned upside down. The document passes through the second reading section 6 and then through the first reading section 5. When the document passes through the second reading section 6, the image is read from one side of the document. When the document passes through the first reading section 5, the image is read from the other side of the document.

The first sheet discharging roller pair 29 and the second sheet discharging roller pair 30 are driven before the leading end of the document reaches the first sheet discharging roller pair 29. The document both surfaces of which have been subjected to reading operations by the second and first reading sections 6 and 5 is thus discharged onto the sheet discharging tray 11. If the image is read from only one side of the document, one of the first and second reading units is used for the reading.

In the present embodiment, the operator optionally determines how to switch the backup color. However, the backup color may be automatically switched according to the type of the document or a reading mode. For example, if the occurrence of offset is limited to double-sided documents, the backup color can be automatically switched to black by performing control such that the solenoid SOL is excited when the double-sided thin document or a double-sided/thin document mode is selected on the operation panel.

According to the present embodiment, the white member 53 is attached to the pivotable support plate 54, and the support plate 54 is allowed to pivot to move the white member 53 between the backup position, where the white member 53 stands opposite the contact glass 7 of the reading unit 4, and the retract position, where the white member 53 is retracted from the backup position. Thus, when the white member 53 is at the backup position, the backup color located opposite the contact glass 7 is white. When the white member 53 is at the retract position, the backup color located opposite the contact glass 7 is black owing to the back member (base member 51) located behind the white member 53. This enables the backup color to be easily switched using the simple configuration. Furthermore, the backup color can be selectively switched when the shading correction data is to be read or according to the type of the document such as single-sided, double-sided, thick, or thin sheets. This makes it possible to prevent the possible offset of the document, allowing appropriate read images to be obtained.

Furthermore, the black member (base member 51), located behind the white member 53, is placed at a distance from the contact lens 7 so as to create a space between the contact glass 7 and the backup glass 52. This reduces the quantity of reflection light from the black member to reliability prevent the possible offset of the document.

Moreover, the guide surface of the black member located opposite the contact glass 7 is composed of the transparent glass (backup glass 52), and the white member 53 is located behind the glass 52. This prevents the document conveyed onto the surface of the white member 53 from rubbing against and damaging the surface. Additionally, the white member 53 is provided in the closed interior between the glass 52 and the base member 51. This makes it possible to prevent foreign matter such as dirt or dust from being attached to the surface of the white member 53.

According to the present embodiment, the regulating member 70 is provided between the backup glass 52 and the white member 53 to create the gap between the backup glass 52 and the white member 53 at the reading position. This makes it possible to prevent possible inappropriate images caused by Newton rings.

Furthermore, the white member 53 is composed of the thin film member and attached to the support member 54 so that the second end of the white member 53 is free and is located at a short distance from the support member 54. This prevents the surface of the white member 53 from being inclined because only one end of the white member 53 in the main scanning direction abuts against the support member 54. The appropriate shading correction data can thus be obtained.

The present invention includes the disclosure of Japanese Patent Laid-Open Application No. 2007-22340.

The invention claimed is:

1. An image reading apparatus comprising:
   reading means having a reading surface on which an image is read from a document;
   a transparent member located opposite the reading surface of the reading means so as to form a path between the transparent member and the reading surface through which the document is passed;
   a white member located on a rear surface side of the transparent member which is different from a reading surface side of the transparent member;
   pivoting means for allowing the white member to pivot between a position where the white member stands opposite the reading surface via the transparent member and a retract position where the member is retracted from the position located opposite the reading surface; and
   regulating means provided between the transparent member and the white member so as to create a specified gap between the white member and a rear surface of the transparent member.

2. The image reading apparatus according to claim 1, wherein a box-like base member is provided to one side surface of which the transparent member is attached and an interior of which is formed to appear black, and the white member is provided inside the box-like base member.

3. The image reading apparatus according to claim 2, wherein the base member, the transparent member, and the white member comprise an integral backup unit, abutting portions abutting against the reading surface are provided on respective sides, in a main scanning direction, of one side surface of the backup unit which is opposite the reading surface, and a biasing member is provided which biases the backup unit toward the reading surface so as to allow the abutting portions to abut against the reading surface.

4. The image reading apparatus according to claim 1, wherein a black member is provided on a side of the white member which is different from a transparent member side of the white member, and the black member is provided outside a focal depth of the reading means.

5. An image reading apparatus comprising:
   reading means of an optical system which has a reading surface on which an image is read from a document;
   conveying means for conveying the document to a reading position provided on a reading surface;
   a transparent member located opposite the reading surface of the reading means so as to form a document conveying path between the transparent member and the reading surface;
   a pivoting member pivotably provided on a rear surface side of the transparent member which is different from a reading surface side of the transparent member; and
   a flexible white member attached to the pivoting member to pivot between an opposite position where the white member stands opposite the reading surface via the transparent member and a retract position where the white member is retracted from the reading surface, the white member having a first end fixed to the pivoting member and a swingable free end extending from the fixed end.

6. The image reading apparatus according to claim 5, wherein regulating means is provided between the transparent member and the white member, and the regulating member abuts against the free end of the white member to create a specified gap in a portion between the transparent member and the white member which is opposite a reading position on the reading surface.

* * * * *